(12) United States Patent
Nishi (10) Patent No.: US 8,884,461 B2
(45) Date of Patent: Nov. 11, 2014

(54) BATTERY SYSTEM FOR VEHICLE AND CONTROL METHOD THEREOF

(75) Inventor: Yuji Nishi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/505,648

(22) PCT Filed: Sep. 13, 2011

(86) PCT No.: PCT/JP2011/005144
§ 371 (c)(1),
(2), (4) Date: May 2, 2012

(87) PCT Pub. No.: WO2013/038441
PCT Pub. Date: Mar. 21, 2013

(65) Prior Publication Data
US 2014/0203633 A1 Jul. 24, 2014

(51) Int. Cl.
*B60L 1/00* (2006.01)
*B60L 11/18* (2006.01)
*H02J 7/00* (2006.01)
*B60L 3/00* (2006.01)
*B60L 11/14* (2006.01)
*B60L 15/00* (2006.01)

(52) U.S. Cl.
CPC .............. *B60L 11/1803* (2013.01); *H02J 7/00* (2013.01); *B60L 3/0046* (2013.01); *B60L 11/14* (2013.01); *B60L 11/1862* (2013.01); *B60L 11/1868* (2013.01); *B60L 11/1883* (2013.01); *B60L 15/007* (2013.01); *B60L 11/1811* (2013.01); *Y02T 10/7044* (2013.01); *Y02T 10/7005* (2013.01); *Y02T 10/7241* (2013.01); *B60L 2210/14* (2013.01); *B60L 2210/20* (2013.01); *B60L 2210/30* (2013.01); *B60L 2220/14* (2013.01); *B60L 2240/545* (2013.01); *B60L 2240/547* (2013.01); *B60L 2240/549* (2013.01); *B60L 2240/80* (2013.01)
USPC .......................................... 307/10.1

(58) Field of Classification Search
USPC .......................................................... 307/10.1
See application file for complete search history.

(56) References Cited

U.S. PATENT DOCUMENTS 5,998,960 A   12/1999  Yamada et al.

FOREIGN PATENT DOCUMENTS

| JP | A-9-298806   | 11/1997 |
| JP | A-10-271611  | 10/1998 |
| JP | A-2000-295784 | 10/2000 |
| JP | A-2004-111242 | 4/2004 |
| JP | A-2004-215456 | 7/2004 |
| JP | A-2006-121874 | 5/2006 |

OTHER PUBLICATIONS

International Search Report issued in International Patent Application No. PCT/JP2011/005144 dated Dec. 13, 2011 (with translation).

*Primary Examiner* — Rexford Barnie
*Assistant Examiner* — Dru Parries
(74) *Attorney, Agent, or Firm* — Oliff PLC (57) ABSTRACT

A battery system includes a motor serving as a driving source for driving a vehicle, a high capacity type battery and a high power type battery each capable of supplying a power to the motor, and a controller controlling charge and discharge of each of the high capacity type battery and the high power type battery. The controller causes the high capacity type battery to be discharged continuously. The controller controls charge and discharge of the high power type battery such that the SOC of the high power type battery is matched with a predetermined value while the high capacity type battery is discharged continuously. The controller causes the high power type battery to be discharged continuously such that the SOC of the high power type battery becomes lower than the predetermined value while the high capacity type battery is not discharged continuously.

14 Claims, 6 Drawing Sheets

BATTERY SYSTEM FOR VEHICLE AND CONTROL METHOD THEREOF

TECHNICAL FIELD

The present invention relates to a battery system in which charge and discharge of each of two types of assembled batteries having different characteristics and mounted on a vehicle are controlled, and a method of controlling the battery system.

BACKGROUND ART

A technology described in Patent Document 1 employs a high power density type of secondary battery and a high energy density type of secondary battery which are connected in parallel as assembled batteries mounted on an electric car. This can maintain a high power density at a fixed level or higher and can provide a high energy density simultaneously.

PRIOR ART DOCUMENT

Patent Document

[Patent Document 1] Japanese Patent Laid-Open No. 2004-111242
[Patent Document 2] Japanese Patent Laid-Open No. 09-298806

SUMMARY OF THE INVENTION

Problems to be Solved by the Invention

Patent Document 1 has made no disclosure of how to control charge and discharge of the high power density type of secondary battery and the high energy density type of secondary battery in view of improvement of vehicle driving performance. The vehicle driving performance may be difficult to ensure in some cases of control of charge and discharge of the high power density type of secondary battery and the high energy density type of secondary battery.

Means for Solving the Problems

A battery system according to a first aspect of the present invention includes a motor serving as a driving source for driving a vehicle, a high capacity type of assembled battery and a high power type of assembled battery each capable of supplying a power to the motor, and a controller controlling charge and discharge of each of the high capacity type of assembled battery and the high power type of assembled battery. The high capacity type of assembled battery has an energy capacity relatively larger than that of the high power type of assembled battery. The high power type of assembled battery can achieve charge and discharge with a current relatively larger than that of the high capacity type of assembled battery.

The controller causes the high capacity type of assembled battery to be discharged continuously. The controller controls charge and discharge of the high power type of assembled battery such that the SOC of the high power type of assembled battery is matched with a predetermined value while the high capacity type of assembled battery is discharged continuously. The controller causes the high power type of assembled battery to be discharged continuously such that the SOC of the high power type of assembled battery becomes lower than the predetermined value while the high capacity type of assembled battery is not discharged continuously.

According to the first aspect of the present invention, since the high capacity type of assembled battery is continuously discharged, the output power of the high capacity type of assembled battery can be used to drive the vehicle. The high capacity type of assembled battery has the energy capacity larger than that of the high power type of assembled battery, so that the travel distance of the vehicle can be ensured by using the output power of the high capacity type of assembled battery.

The charge and discharge of the high power type of assembled battery are controlled such that the SOC of the high power type of assembled battery is changed to be matched with the predetermined value while the high capacity type of assembled battery is continuously discharged. Thus, when the required power of the vehicle is larger than the output power of the high capacity type of assembled battery, the output power of the high power type of assembled battery can be used to ensure the required power. When regenerative power is produced in braking of the vehicle, the regenerative power can be accumulated on the high power type of assembled battery. The charge or discharge of the high power type of assembled battery can be used depending on the driving state of the vehicle in this manner.

A power converter can be used to convert an output power of the high capacity type of assembled battery into a power to be supplied to the motor. The power converter can be used to maintain the power to be supplied from the high capacity type of assembled battery to the motor at a fixed power. Thus, the high capacity type of assembled battery can be discharged at an almost constant current to prevent occurrence of an overcurrent or an overvoltage in the high capacity type of assembled battery.

The power converter can be provided by using a step-up converter increasing an output voltage of the high capacity type of assembled battery. An electric current value passing through a reactor of the step-up converter can be controlled to maintain the power to be output from the step-up converter to the motor at the fixed power. The high power type of assembled battery can be connected to a power line connecting the power converter with the motor. The fixed power can be an average value of the required power in a predetermined time period.

The continuous discharge may not be performed depending on the charge state of each of the high capacity type of assembled battery and the high power type of assembled battery. Each of the high capacity type of assembled battery and the high power type of assembled battery can be supplied with a power from a power source provided externally to the vehicle while the high capacity type of assembled battery and the high power type of assembled battery are not discharged continuously. This can achieve the continuous discharge of the high capacity type of assembled battery and the high power type of assembled battery again.

According to a second aspect of the present invention, a control method of controlling charge and discharge of each of a high capacity type of assembled battery and a high power type of assembled battery is provided. Each of the high capacity type of assembled battery and the high power type of assembled battery can supply a power to a motor serving as a driving source for driving a vehicle. The high capacity type of assembled battery has an energy capacity relatively larger than that of the high power type of assembled battery. The high power type of assembled battery can achieve charge and discharge with a current relatively larger than that of the high capacity type of assembled battery.

The high capacity type of assembled battery is continuously discharged. Charge and discharge of the high power type of assembled battery are controlled such that the SOC of the high power type of assembled battery is matched with a predetermined value while the high capacity type of assembled battery is discharged continuously. The high power type of assembled battery is continuously discharged such that the SOC of the high power type of assembled battery becomes lower than the predetermined value while the high capacity type of assembled battery is not discharged continuously. The second aspect of the present invention can provide the similar effects to those of the first aspect of the present invention.

MODE FOR CARRYING OUT THE INVENTION

An embodiment of the present invention will hereinafter be described.

Embodiment 1

Figure 1:
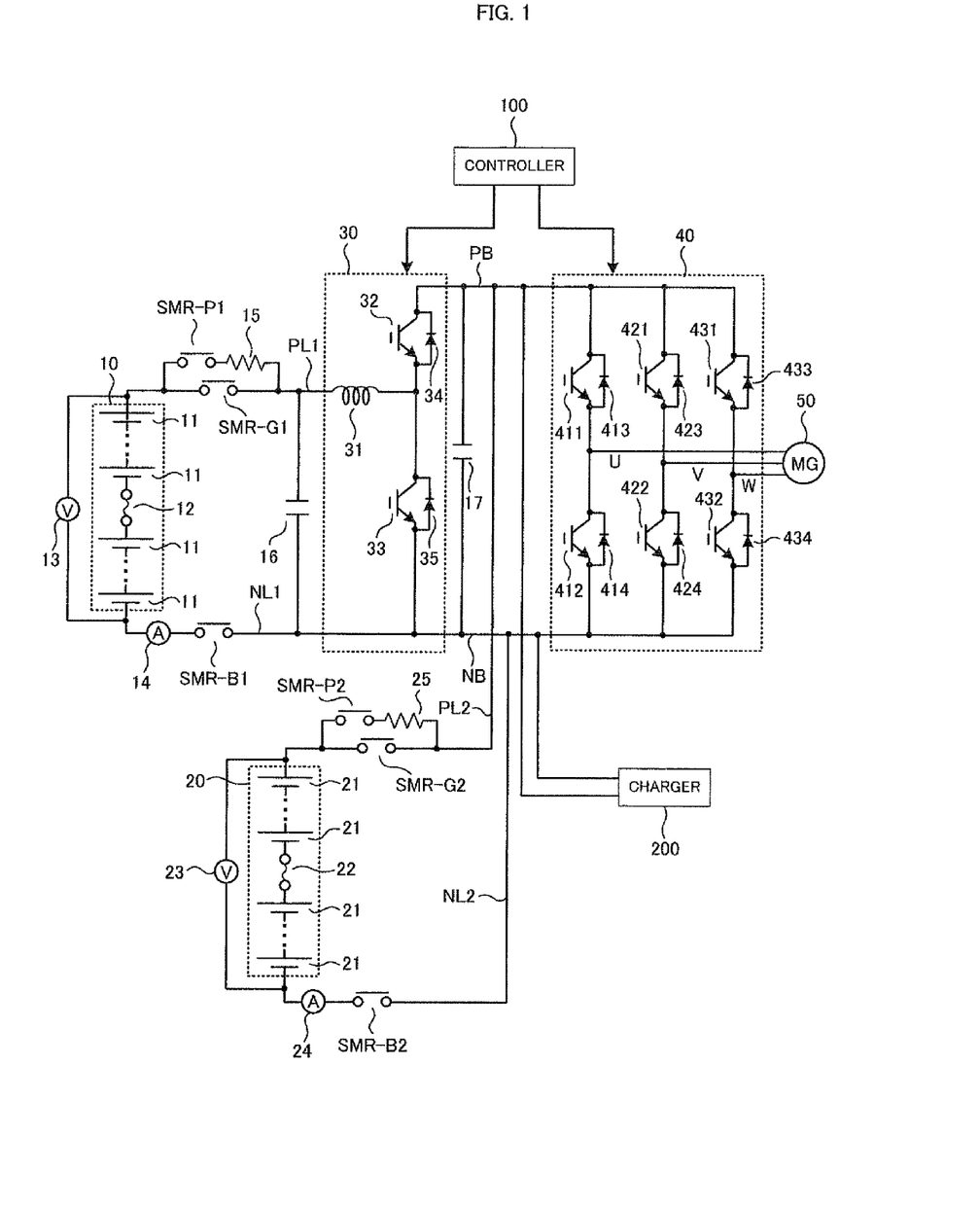
FIG. 1 is a diagram showing the configuration of a battery system.

A battery system which is Embodiment 1 of the present invention is described. FIG. 1 is a diagram showing the configuration of the battery system according to the present embodiment. The battery system according to the present embodiment is mounted on a vehicle. Examples of the vehicle include an electric vehicle and a hybrid vehicle. The electric vehicle includes only an assembled battery, later described, as the power source for driving of the vehicle. The hybrid vehicle includes an engine or a fuel cell in addition to the assembled battery, later described, as the power source for driving of the vehicle.

A high capacity type of assembled battery 10 has a plurality of cells 11 connected in series. A fuse 12 is connected to two of the cells 11 included in the high capacity type of assembled battery 10. A high power type of assembled battery 20 has a plurality of cells 21 connected in series. A fuse 22 is connected to two of the cells 21 included in the high power type of assembled battery 20. A secondary battery such as a nickel metal hydride battery and a lithium-ion battery can be used as each of the cells 11 and 21.

The high capacity type of assembled battery 10 has an energy capacity larger than that of the high power type of assembled battery 20. The high power type of assembled battery 20 can achieve charge and discharge with a larger current than that of the high capacity type of assembled battery 10. While the plurality of cells 11 and 21 constituting the assembled batteries 10 and 20, respectively, are connected in series in FIG. 1, the assembled batteries 10 and 20 may include the plurality of cells 11 and 21 connected in parallel, respectively. The difference between the assembled batteries 10 and 20 is described later.

A voltage sensor 13 detects a voltage between terminals of the high capacity type of assembled battery 10 and outputs the detection result to a controller 100. A current sensor 14 detects charge and discharge currents of the high capacity type of assembled battery 10 and outputs the detection result to the controller 100. A voltage sensor 23 detects a voltage between terminals of the high power type of assembled battery 20 and outputs the detection result to the controller 100. A current sensor 24 detects charge and discharge currents of the high power type of assembled battery 20 and outputs the detection result to the controller 100.

The high capacity type of assembled battery 10 is connected to a step-up converter 30 through a positive electrode line PL1 and a negative electrode line NL1. A capacitor 16 is connected to the positive electrode line PL1 and the negative electrode line NL1 and smoothes fluctuations in voltage between the positive electrode line PL1 and the negative electrode line NL1.

A system main relay SMR-G1 is provided for the positive electrode line PL1, and a system main relay SMR-B1 is provided for the negative electrode line NL1. A system main relay SMR-P1 and a limiting resistance 15 are connected in series with each other and are connected in parallel with the system main relay SMR-G1.

The system main relays SMR-G1, SMR-P1, and SMR-B1 are switched between ON and OFF in response to a control signal from the controller 100. For connecting the high capacity type of assembled battery 10 to the step-up converter 30, the system main relays SMR-P1 and SMR-B1 are first switched from OFF to ON. An electric current passes through the limiting resistance 15 at this point. Next, the system main relay SMR-G1 is switched from OFF to ON, and the system main relay SMR-P1 is switched from ON to OFF.

The connection between the high capacity type of assembled battery 10 and the step-up converter 30 is completed in this manner. For breaking the connection between the high capacity type of assembled battery 10 and the step-up converter 30, the system main relays SMR-G1 and SMR-B1 are switched from ON to OFF.

The high power type of assembled battery 20 is connected to an inverter 40 through a positive electrode line PL2 and a negative electrode line NL2. A system main relay SMR-G2 is provided for the positive electrode line PL2, and a system main relay SMR-B2 is provided for the negative electrode line NL2. A system main relay SMR-P2 and a limiting resistance 25 are connected in series with each other and are connected in parallel with the system main relay SMR-G2.

The system main relays SMR-G2, SMR-P2, and SMR-B2 are switched between ON and OF in response to a control signal from the controller 100. For connecting the high power type of assembled battery 20 to the inverter 40, the system main relays SMR-P2 and SMR-B2 are first switched from OFF to ON. An electric current passes through the limiting resistance 25 at this point. Next, the system main relay SMR-G2 is switched from OFF to ON, and the system main relay SMR-P2 is switched from ON to OFF.

The connection between the high power type of assembled battery 20 and the inverter 40 is completed in this manner. For breaking the connection between the high power type of assembled battery 20 and the inverter 40, the system main relays SMR-G2 and SMR-32 are switched from ON to OFF.

The step-up converter 30 increases a voltage between the positive electrode line PL1 and the negative electrode line NL2 and outputs the increased voltage to bus lines PB and NB. The step-up converter 30 has a reactor 31. One end of the reactor 31 is connected to the positive electrode line PL and the other end of the reactor 31 is connected to an emitter of a transistor 32 and a collector of a transistor 33.

The transistors 32 and 33 are connected in series between the bus lines PB and NB. Each of the transistors 32 and 33 can be provided, for example by using an IGBT (Insulated Gate Bipolar Transistor), an npn-type transistor, or a power MOSFET (Metal Oxide Semiconductor Field-Effect Transistor).

Diodes 34 and 35 are connected in parallel with the transistors 32 and 33, respectively. Specifically, anodes of the diodes 34 and 35 are connected to emitters of the transistors 32 and 33, respectively, and cathodes of the diodes 34 and 35 are connected to collectors of the transistors 32 and 33, respectively. A capacitor 17 is connected to the bus lines PB and NB and smoothes fluctuations in voltage between the bus lines PB and NB.

The step-up converter 30 performs step-up operation and step-down operation. In performing the step-up operation by the step-up converter 30, the controller 100 turns on the transistor 33 and turns off the transistor 32. This causes an electric current to pass from the high capacity type of assembled battery 10 to the reactor 31, and a magnetic field energy is accumulated on the reactor 31 in accordance with the amount of the electric current. Next, the controller 100 switches the transistor 33 from ON to OFF to cause an electric current to pass from the reactor 31 to the inverter 40 through the diode 34. This allows the energy accumulated on the reactor 31 to be released from the step-up converter 30 to achieve the step-up operation.

In performing the step-down operation by the step-up converter 30, the controller 100 turns on the transistor 32 and turns off the transistor 33. This causes the power from the inverter 40 to be supplied to the high capacity type of assembled battery 10 to charge the high capacity type of assembled battery 10.

The inverter 40 converts a DC power supplied from the step-up converter 30 or the high power type of assembled battery 20 into an AC power and outputs the AC power to a motor generator (MG) 50. The inverter 40 also converts an AC power generated by the motor generator 50 into a DC power and outputs the DC power to the step-up converter 30. The inverter 40 operates in response to a control signal from the controller 100. The motor generator 50 is a three-phase AC motor.

The inverter 40 has a U-phase arm, a V-phase arm, and a W-phase arm. The U-phase arm, the V-phase arm, and the W-phase arm are connected in parallel.

The U-phase arm has transistors 411 and 412 and diodes 413 and 414. The transistors 411 and 412 are connected in series between the bus lines PB and NB. The diodes 413 and 414 are connected in parallel with the transistors 411 and 412, respectively. Specifically, anodes of the diodes 413 and 414 are connected to emitters of the transistors 411 and 412, respectively, and cathodes of the diodes 413 and 414 are connected to collectors of the transistors 411 and 412, respectively.

The V-phase arm has transistors 421 and 422 and diodes 423 and 424. The transistors 421 and 422 are connected in series between the bus lines PB and NB. The diodes 423 and 424 are connected in parallel with the transistors 421 and 422, respectively. Specifically, anodes of the diodes 423 and 424 are connected to emitters of the transistors 421 and 422, respectively, and cathodes of the diodes 423 and 424 are connected to collectors of the transistors 421 and 422, respectively.

The W-phase arm has transistors 431 and 432 and diodes 433 and 434. The transistors 431 and 432 are connected in series between the bus lines PB and NB. The diodes 433 and 434 are connected in parallel with the transistors 431 and 432, respectively. Specifically, anodes of the diodes 433 and 434 are connected to emitters of the transistors 431 and 432, respectively, and cathodes of the diodes 433 and 434 are connected to collectors of the transistors 431 and 432, respectively.

The motor generator 50 converts an electrical energy supplied from the inverter 40 into a kinetic energy. The motor generator 50 is connected to wheels, and the kinetic energy (rotation force) produced by the motor generator 50 is transferred to the wheels. This can drive the vehicle. For decelerating or stopping the vehicle, the motor generator 50 receives the rotation force from the wheels to generate power. The AC power generated by the motor generator 50 is output to the inverter 40.

A charger 200 is connected to the bus lines PB and NB and supplies power from an external power source to the assembled batteries 10 and 20. For example, a commercial power source can be used as the external power source. When the external power source supplies an AC power, the charger 200 converts the AC power into a DC power and outputs the DC power to the assembled batteries 10 and 20. When the external power source supplies a DC power, the DC power is supplied to the assembled batteries 10 and 20.

Next, description is made of the characteristics of the cell 11 used in the high capacity type of assembled battery 10 and the characteristics of the cell 21 used in the high power type of assembled battery 20. Table 1 shows the comparison between the characteristics of the cells 11 and 12. In table 1, "high" and "low" represent relative levels when the two cells 11 and 21 are compared. Specifically, "high" means a level higher than that of the cell to be compared, whereas "low" means a level lower than that of the cell to be compared.

TABLE 1

|  | cell 11 (high capacity type) | cell 21 (high power type) |
| --- | --- | --- |
| output density | low | high |
| power capacity density | high | low |
| temperature dependence of input/output | high | low |
| temperature dependence of battery life | high | low |

The output density of the cell 21 is higher than the output density of the cell 11. The output density of each of the cells 11 and 21 can be represented as the power of the cell per unit mass ([W/kg]) or the power of the cell per unit volume ([W/L]), for example. Assuming that the cells 11 and 21 have the equal mass or volume, the output [W] of the cell 21 is higher than the output [W] of the cell 11.

The output density of an electrode element (a positive electrode element or a negative electrode element) of each of the cells 11 and 21 can be represented as the electric current value of the electrode element per unit area ([mA/cm^2]), for example. The output density of the electrode element of the cell 21 is higher than that of the cell 11. Assuming that the electrode elements have the equal area, the value of electric current capable of being passed through the electrode element of the cell 21 is higher than the value of electric current capable of being passed through the electrode element of the cell 11.

The power capacity density of the cell 11 is higher than the power capacity density of the cell 21. The power capacity density of each of the cells 11 and 21 can be represented as the capacity of the cell per unit mass ([Wh/kg]) or the capacity of the cell per unit volume ([Wh/L]), for example. Assuming that the cells 11 and 21 have the equal mass or volume, the power capacity [Wh] of the cell 11 is larger than the power capacity [Wh] of the cell 21.

The capacity density of the electrode element of each of the cells 11 and 21 can be represented as the capacity of the electrode element per unit mass ([mAh/g]) or the capacity of the electrode element per unit volume ([mAh/cc]), for example. The capacity density of the electrode element of the cell 11 is higher than that of the cell 21. Assuming that the electrode elements have the equal mass or volume, the capacity of the electrode element of the cell 11 is larger than the capacity of the electrode element of the cell 21.

When the lithium-ion secondary battery is used as the cells 11 and 21, graphite can be used as a negative electrode active material of the cell 11, and a lithium-nickel composite oxide can be used as a positive electrode active material of the cell 11, for example. Hard carbon (non-graphitizable carbon material) can be used as a negative electrode active material of the cell 21, and a lithium-manganese composite oxide can be used as a positive electrode active material of the cell 21, by way of example.

Figure 2:
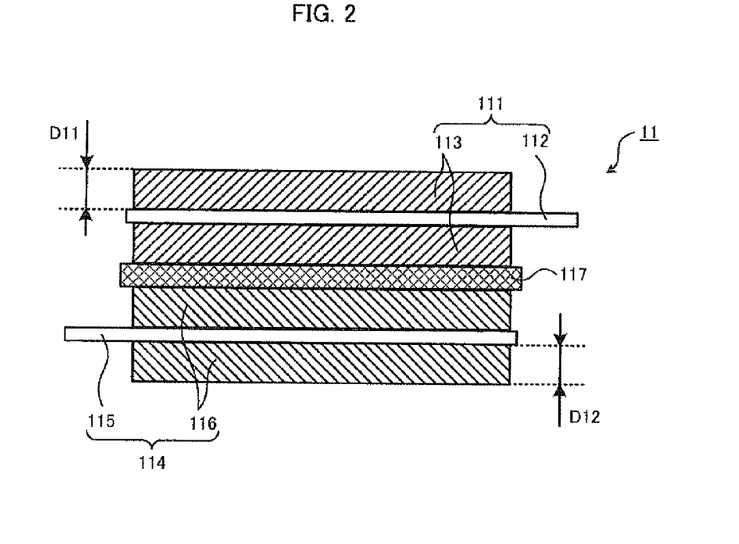
FIG. 2 is a diagram showing the configuration of a power-generating element used in a cell of a high power type of assembled battery.
Figure 3:
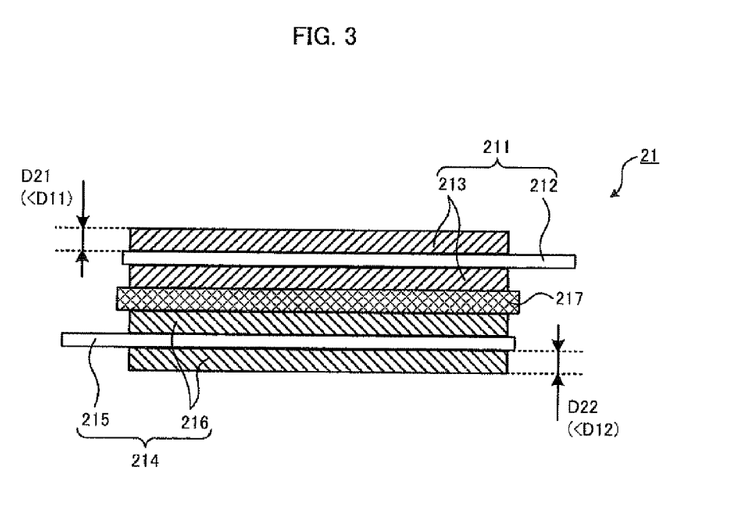
FIG. 3 is a diagram showing the configuration of a power-generating element used in a cell of a high capacity type of assembled battery.

FIG. 2 is a schematic diagram showing the configuration of a power-generating element in the cell 11. FIG. 3 is a schematic diagram showing the configuration of a power-generating element in the cell 21.

In FIG. 2, a positive electrode element 111 forming part of the power-generating element of the cell 11 has a collector plate 112 and an active material layer 113 formed on both surfaces of the collector plate 112. When the cell 11 is a lithium-ion secondary battery, aluminum can be used as the material of the collector plate 112, for example. The active material layer 113 includes a positive electrode active material, a conductive material, a binder and the like.

A negative electrode element 114 forming part of the power-generating element of the cell 11 has a collector plate 115 and an active material layer 116 formed on both surfaces of the collector plate 115. When the cell 11 is a lithium-ion secondary battery, copper can be used as the material of the collector plate 115, for example. The active material layer 116 includes a negative electrode active material, a conductive material, a binder and the like.

A separator 117 is placed between the positive electrode element 111 and the negative electrode element 114. The separator 117 is in contact with the active material layer 113 of the positive electrode element 111 and with the active material layer 116 of the negative electrode element 114. The positive electrode element 111, the separator 117, and the negative electrode element 114 are stacked in this order to form a stack, and the stack is rolled up to provide the power-generating element.

While the active material layer 113 is formed on both surfaces of the collector plate 112 and the active material layer 116 is formed on both surfaces of the collector plate 115 in the present embodiment, the present invention is not limited thereto. Specifically, a so-called bipolar electrode can be used. In the bipolar electrode, the positive electrode active material layer 113 is formed on one surface of a collector plate and the negative electrode active material layer 116 is formed on the other surface of the collector plate. A plurality of bipolar electrodes can be stacked with a separator sandwiched between them to provide the power-generating element.

In FIG. 3, a positive electrode element 211 forming part of the power-generating element of the cell 21 has a collector plate 212 and an active material layer 213 formed on both surfaces of the collector plate 212. When the cell 21 is a lithium-ion secondary battery, aluminum can be used as the material of the collector plate 212, for example. The active material layer 213 includes a positive electrode active material, a conductive material, a binder and the like.

A negative electrode element 214 forming part of the power-generating element of the cell 21 has a collector plate 215 and an active material layer 216 formed on both surfaces of the collector plate 215. When the cell 21 is a lithium-ion secondary battery, copper can be used as the material of the collector plate 215, for example. The active material layer 216 includes a negative electrode active material, a conductive material, a binder and the like. A separator 217 is placed between the positive electrode element 211 and the negative electrode element 214. The separator 217 is in contact with the active material layer 213 of the positive electrode element 211 and the active material layer 216 of the negative electrode element 214.

As shown in FIG. 2 and FIG. 3, when the positive electrode elements 111 and 211 in the cell 11 and the cell 21, respectively, are compared, a thickness D21 of the active material layer 213 is smaller than a thickness D11 of the active material layer 113. When the negative electrode elements 114 and 214 in the cell 11 and the cell 21, respectively, are compared, a thickness D22 of the active material layer 216 is smaller than a thickness D12 of the active material layer 116. Since the thicknesses D21 and D22 of the active material layers 213 and 216 are smaller than the thicknesses D11 and D12 of the active material layers 113 and 116, respectively, an electric current easily passes between the positive electrode element 211 and the negative electrode element 214 in the cell 21. Thus, the output density of the cell 21 is higher than the output density of the cell 11.

In terms of the volume of the active material layer per unit capacity ([cc/mAh]), the active material layer 213 is higher than the active material layer 113, and the active material layer 216 is higher than the active material layer 116. Since the thicknesses D11 and D12 of the active material layers 113 and 116 are larger than the thicknesses D21 and D22 of the active material layers 213 and 216, respectively, the capacity density of the cell 11 is higher than the capacity density of the cell 21. The internal resistance of the cell 11 is higher than the internal resistance of the cell 21.

Figure 4:
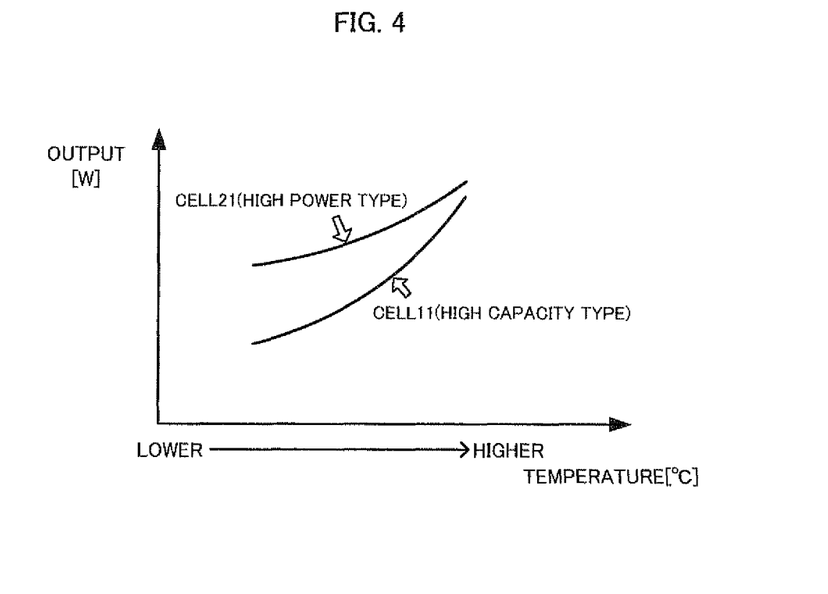
FIG. 4 is a graph showing the relationship between output and temperature in the cells.

Next, description is made of temperature dependence of input/output of the battery. As shown in Table 1, the temperature dependence of the input/output of the cell 11 is higher than that of the cell 21. In other words, the input/output of the cell 11 changes in response to temperature changes more easily than the input/output of the cell 21. FIG. 4 shows the output characteristics of the cells 11 and 21 in response to temperature. In FIG. 4, the horizontal axis represents the temperature and the vertical axis represents the output. While FIG. 4 shows the output characteristics of the cells 11 and 21, the input characteristics of the cells 11 and 21 also have the similar relationship to that in FIG. 4.

As shown in FIG. 4, the output performances of the cells 11 and 21 reduce as the temperature drops. The reduction rate of the output performance in the cell 11 is higher than the reduction rate of the output performance in the cell 21. In other words, the output performance of the cell 11 is more susceptible to the temperature than the output performance of the cell 21.

Figure 5:
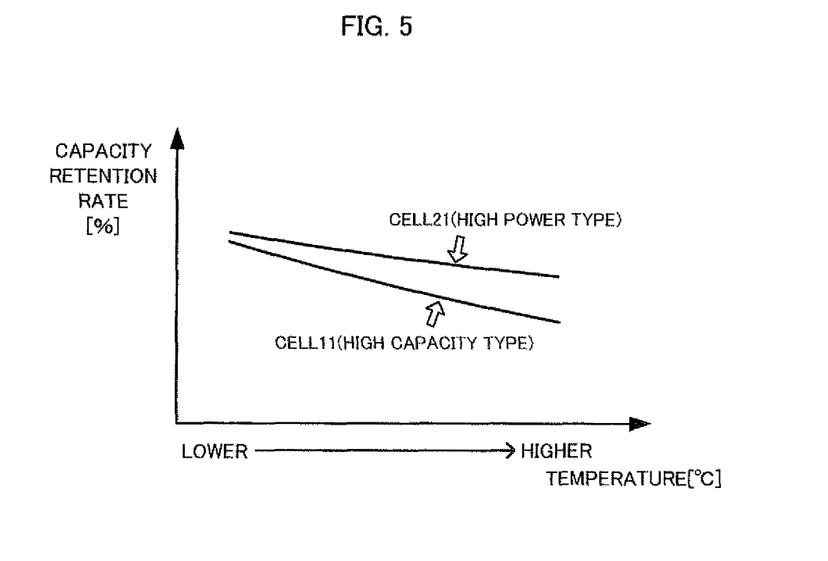
FIG. 5 is a graph showing the relationship between capacity retention rate and temperature in the cells.

FIG. 5 shows a graph representing the relationship between the capacity retention rates of the cells 11 and 21 and the temperature. In FIG. 5, the horizontal axis represents the temperature and the vertical axis represents the capacity retention rate. The capacity retention rate is represented by a ratio (deterioration capacity/initial capacity) between a capacity (initial capacity) of the cell 11 or 21 in an initial state and a capacity (deterioration capacity) of the cell 11 or 21 in a used state (deterioration state). The initial state refers to the state immediately after the cells 11 and 21 are manufactured and the state before the cells 11 and 21 are used. The graph shown in FIG. 5 shows the capacity retention rates of the cells 11 and 21 after repeated charge and discharge of the cells at each temperature.

As shown in FIG. 5, the capacity retention rates of the cells 11 and 21 tend to reduce as the temperature rises. The reduced capacity retention rates mean the deterioration of the cells 11 and 21. The reduction rate of the capacity retention rate of the cell 11 with a temperature rise is higher than that of the cell 21. In other words, the cell 11 is deteriorated in response to a temperature rise (temperature change) more easily than the cell 21. Thus, the high capacity type of assembled battery 10 has a higher temperature dependence than that of the high power type of assembled battery 20.

Figure 6:
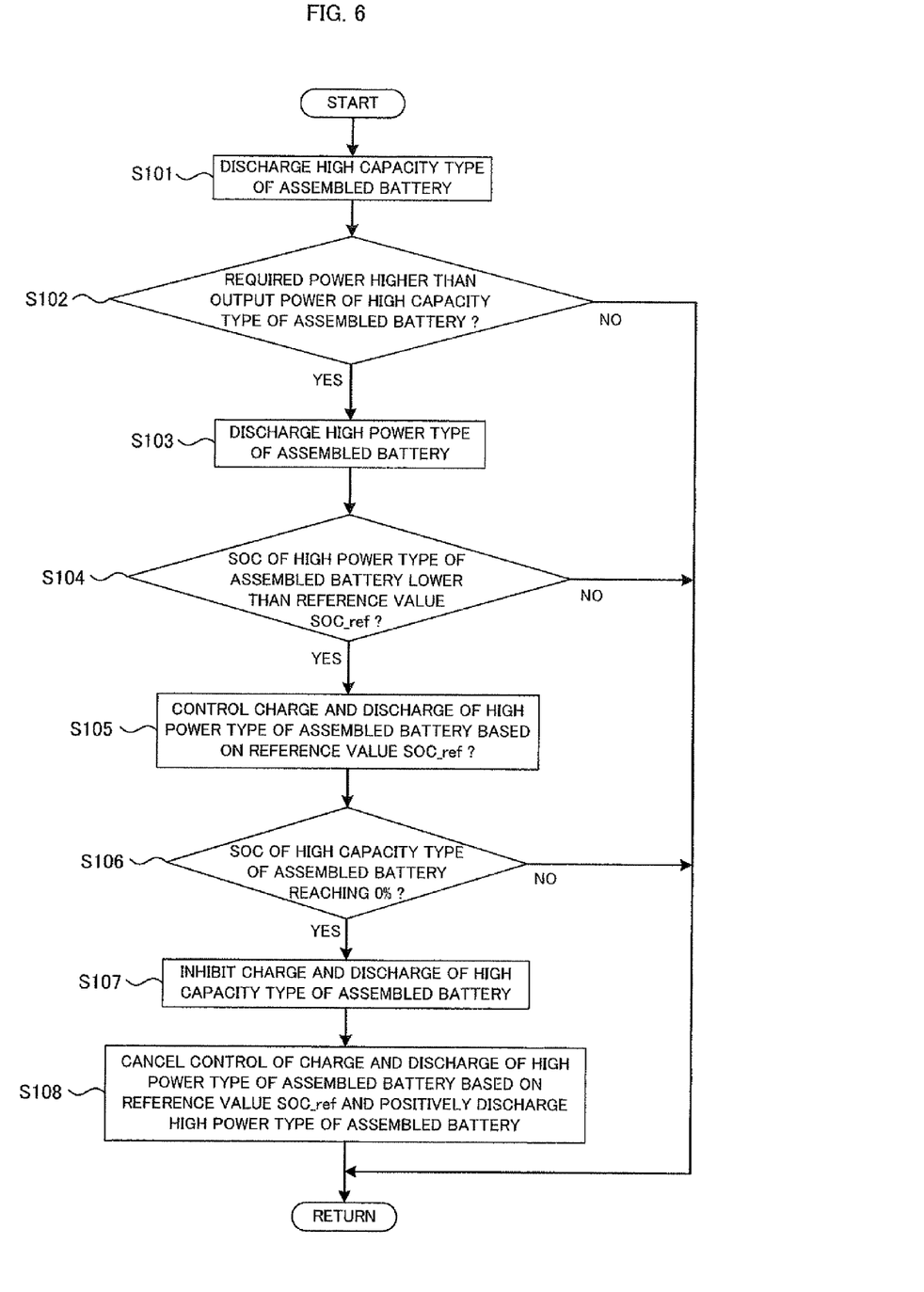
FIG. 6 is a flow chart for describing the operation of the battery system.
Figure 7:
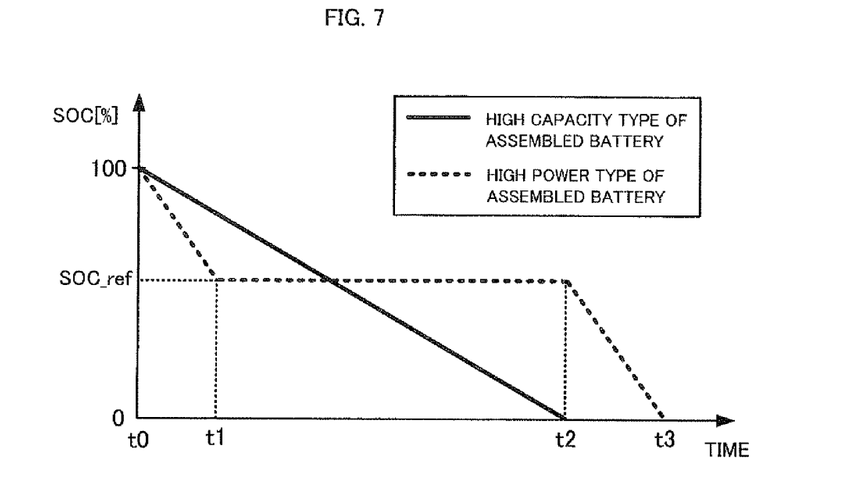
FIG. 7 is a graph showing change of SOC in each of the high capacity type of assembled battery and the high power type of assembled battery.

The operation of the battery system according to the present embodiment is described with reference to a flow chart shown in FIG. 6. The processing shown in FIG. 6 is performed by the controller 100 and is repeatedly performed at predetermined intervals. FIG. 7 is a graph showing (an example of) changes of the SOC (State of Charge) in the assembled batteries 10 and 20. In FIG. 7, the horizontal axis represents time and the vertical axis represents the SOC. The SOC is a ratio of the present charge capacity to full charge capacity.

The processing shown in FIG. 6 can be started, for example when the assembled batteries 10 and 20 are fully charged. While FIG. 7 shows that the SOC of the assembled batteries 10 and 20 are 100% at a timing (t0) when the processing shown in FIG. 6 is started, the present invention is not limited thereto. The processing shown in FIG. 2 can be started even when the SOC of the assembled batteries 10 and 20 are at levels lower than 100%. When the SOC of the assembled batteries 10 and 20 are set to be close to 100%, the travel distance of the vehicle can be extended.

At the start of the processing shown in FIG. 6, the system main relays SMR-G1, SMR-B1, SMR-G2, and SMR-B2 are ON, and the assembled batteries 10 and 20 are connected to a load (such as the step-up converter 30 and the inverter 40).

At step S101, the controller 100 starts discharge of the high capacity type of assembled battery 10. The SOC of the high capacity type of assembled battery 10 starts to reduce.

At step S102, the controller 100 determines whether the required power of the vehicle is higher than the output power of the high capacity type of assembled battery 10. The required power of the vehicle is changed, for example in response to operation of an accelerator pedal (not shown). When a driver presses the accelerator pedal to increase the required power of the vehicle, the required power of the vehicle easily becomes higher than the output power of the high capacity type of assembled battery 10. When the required power of the vehicle is higher than the output power of the high capacity type of assembled battery 10, the controller 100 proceeds to step S103, and when not, the processing is ended.

At step S103, the controller 100 discharges the high power type of assembled battery 20. This supplies the output powers of the assembled batteries 10 and 20 to the motor generator 50 to drive the vehicle. The high power type of assembled battery 20 can achieve charge and discharge with a larger current than that of the high capacity type of assembled battery 10. Thus, the output power of the high power type of assembled battery 20 is used to provide the part of the required power of the vehicle exceeding the output power of the high capacity type of assembled battery 20 to ensure the required power of the vehicle easily.

When the assembled batteries 10 and 20 are discharged, the SOC of the assembled batteries 10 and 20 start to reduce as shown in FIG. 7. The regenerative power generated by the motor generator 50 can be accumulated on the high power type of assembled battery 20.

At step S104, the controller 100 determines whether or not the SOC of the high power type of assembled battery 20 is lower than a reference value SOC_ref. The controller 10 can estimate the SOC of the high power type of assembled battery 20 based on the output of the voltage sensor 23.

The SOC of the high power type of assembled battery 20 has a correspondence with the OCV (Open Circuit Voltage) of the high power type of assembled battery 20. When the correspondence between the SOC and OCV is previously determined, the SOC of the high power type of assembled battery 20 can be specified from the OCV of the high power type of assembled battery 20. The OCV of the high power type of assembled battery 20 is determined from the CCV (Closed Circuit Voltage) of the high power type of assembled battery 20, that is, the voltage detected by the voltage sensor 23 and the amount of voltage drop due to reaction resistance in the high power type of assembled battery 20.

While the SOC of the high power type of assembled battery 20 is estimated from the voltage detected by the voltage sensor 23 in this case, the present invention is not limited thereto. For example, the SOC of the high power type of assembled battery 20 can be estimated, for example by summing the charge and discharge currents of the high power type of assembled battery 20. The charge and discharge currents of the high power type of assembled battery 20 can be obtained with the current sensor 24.

The reference value SOC_ref is a value lower than 100% and higher than 0% and can be set as appropriate in view of the driving performance of the vehicle and the like. For example, the reference value SOC_ref can be set as described below.

Figure 8:
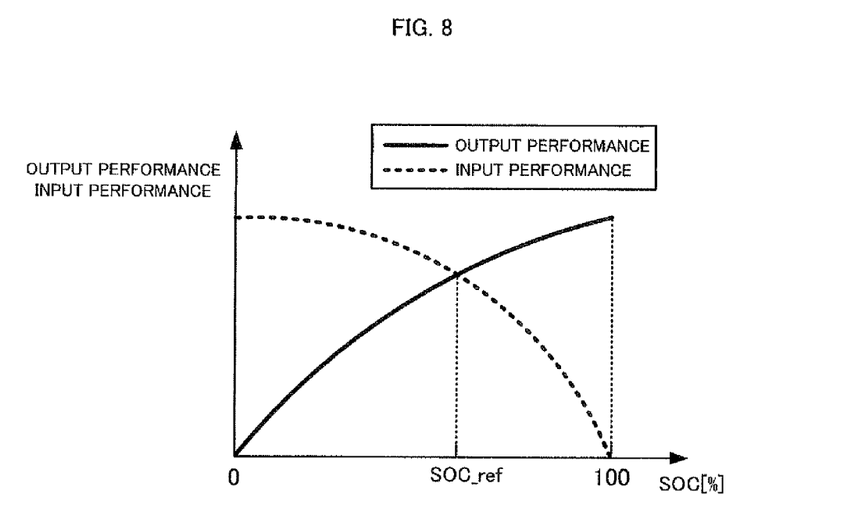
FIG. 8 is a graph showing output performance and input performance of the high power type of assembled battery.

FIG. 8 shows the output performance and input performance of the high power type of assembled battery 20. In FIG. 8, the vertical axis represents the input performance and the output performance of the high power type of assembled battery 20, and the horizontal axis represents the SOC of the high power type of assembled battery 20. As the SOC of the high power type of assembled battery 20 increases, the output performance of the high power type of assembled battery 20 improves. Specifically, in response to the increase in the SOC of the high power type of assembled battery 20, the output of the high power type of assembled battery 20 is more easily ensured, and the input of the high power type of assembled battery 20 is less easily ensured. In other words, in response to the reduction in the SOC of the high power type of assembled battery 20, the input of the high power type of assembled battery 20 is more easily ensured, and the output of the high power type of assembled battery 20 is less easily ensured.

The reference value SOC_ref can be set to the SOC at which the curve representing the output performance intersects the curve representing the input performance. This setting of the reference value SOC_ref allows the output and the input of the high power type of assembled battery 20 to be easily ensured when the SOC of the high power type of assembled battery 20 is at the reference value SOC_ref. In other words, it is possible to prevent only the input or the output of the high power type of assembled battery 20 from being ensured.

When only the input of the high power type of assembled battery 20 is ensured, the high power type of assembled battery 20 cannot be discharged (output), and the required power is difficult to ensure. On the other hand, when only the output of the high power type of assembled battery 20 is ensured, the high power type of assembled battery 20 cannot be charged (input), and the regenerative power cannot be accumulated. In this manner, the driving performance of the vehicle is difficult to enhance when only the input or the output of the high power type of assembled battery 20 is ensured.

The reference value SOC_ref may be shifted from the value described in FIG. 8. Even when the reference value SOC_ref is shifted from the value described in FIG. 8, the input and the output of the high power type of assembled battery 20 can be ensured. The shift (allowable amount) from the value described in FIG. 8 can be set as appropriate.

At step S104, when the SOC of the high power type of assembled battery 20 is lower than the reference value SOC_ref, the controller 100 proceeds to processing at step S105, and when not, the processing is ended.

At step S105, the controller 100 controls charge or discharge of the high power type of assembled battery 20 such that the SOC of the high power type of assembled battery 20 is matched with the reference value SOC_ref. Specifically, when the SOC of the high power type of assembled battery 20 is lower than the reference value SOC_ref, the controller 100 puts a higher priority on the charge of the high power type of assembled battery 20 to bring the SOC of the high power type of assembled battery 20 closer to the reference value SOC_ref. In charging the high power type of assembled battery 20, the regenerative power generated by the motor generator 50 can be supplied to the high power type of assembled battery 20, or the output power of the high capacity type of assembled battery 10 can be supplied to the high power type of assembled battery 20.

On the other hand, when the SOC of the high power type of assembled battery 20 is higher than the reference value SOC_ref, the controller 100 puts a higher priority on the discharge of the high power type of assembled battery 20 to bring the SOC of the high power type of assembled battery 20 closer to the reference value SOC_ref. In discharging the high power type of assembled battery 20, the output power of the high power type of assembled battery 20 is supplied to the motor generator 50.

Since the high power type of assembled battery 20 has the energy capacity smaller than that of the high capacity type of assembled battery 10, the SOC of the high power type of assembled battery 20 may reduce more easily than the SOC of the high capacity type of assembled battery 10 as shown in FIG. 7. In the example shown in FIG. 7, the SOC of the high power type of assembled battery 20 reaches the reference value SOC_ref at time t1. After time t1, the controller 100 controls charge or discharge of the high power type of assembled battery 20 such that the SOC of the high power type of assembled battery 20 is matched with the reference value SOC_ref.

At step S106, the controller 100 determines whether or not the SOC of the high capacity type of assembled battery 10 reaches 0%. The SOC of the high capacity type of assembled battery 10 can be estimated with a method similar to the method of estimating the SOC of the high power type of assembled battery 20. When the SOC of the high capacity type of assembled battery 10 reaches 0%, the controller proceeds to processing at step S107, and when not, the processing is ended.

At step S107, the controller 100 stops the charge and discharge of the high capacity type of assembled battery 10. In FIG. 7, the SOC of the high capacity type of assembled battery 10 reaches 0% at time t2, and after time t2, the charge and discharge of the high capacity type of assembled battery 10 is stopped. The regenerative power generated by the motor generator 50 is accumulated on the high power type of assembled battery 20. While the high capacity type of assembled battery 10 is discharged until the SOC of the high capacity type of assembled battery 10 reaches 0% in the present embodiment, the present invention is not limited thereto. For example, the charge and discharge of the high capacity type of assembled battery 10 can be stopped immediately before the SOC of the high capacity type of assembled battery 10 reaches 0%.

The high capacity type of assembled battery 10 is continuously discharged until the SOC of the high capacity type of assembled battery 10 changes from 100% to 0% so that the electrical energy accumulated on the high capacity type of assembled battery 10 is used up, thereby making it possible to extend the travel distance of the vehicle. Since the power of the high capacity type of assembled battery 10 is used, the power supply from the high power type of assembled battery 20 can be suppressed. In other words, the power of the high power type of assembled battery 20 can be used supplementally in driving of the vehicle.

At step S108, the controller 100 cancels the control of charge and discharge of the high power type of assembled battery 20 based on the reference value SOC_ref. Then, the controller 100 discharges the high power type of assembled battery 20 more and more. Since the SOC of the high capacity type of assembled battery 10 reaches 0%, it is necessary to discharge the high power type of assembled battery 20 more and more in order to ensure the required power of the vehicle. Thus, as shown in FIG. 7, the SOC of the high power type of assembled battery 20 starts to reduce from the reference value SOC_ref after time t2.

While the regenerative power is accumulated on the high power type of assembled battery 20 in some driving patterns of the vehicle, the SOC of the high power type of assembled battery 20 is easily reduced with the driving of the vehicle. When the high power type of assembled battery 20 continues to be discharged, the SOC of the high power type of assembled battery 20 reaches 0% at time t3. After the SOC of the assembled batteries 10 and 20 reach 0%, the charger 200 can be used to charge the assembled batteries 10 and 20. This can bring the SOC of the assembled batteries 10 and 20 closer to 100%. After the assembled batteries 10 and 20 are charged, the processing shown in FIG. 6 can be performed.

According to the present embodiment, the output power of the high capacity type of assembled battery 10 can be used to drive the vehicle. When the required power of the vehicle is higher than the output power of the high capacity type of assembled battery 10, the shortage of power can be covered by the output power of the high power type of assembled battery 20.

Figure 9:
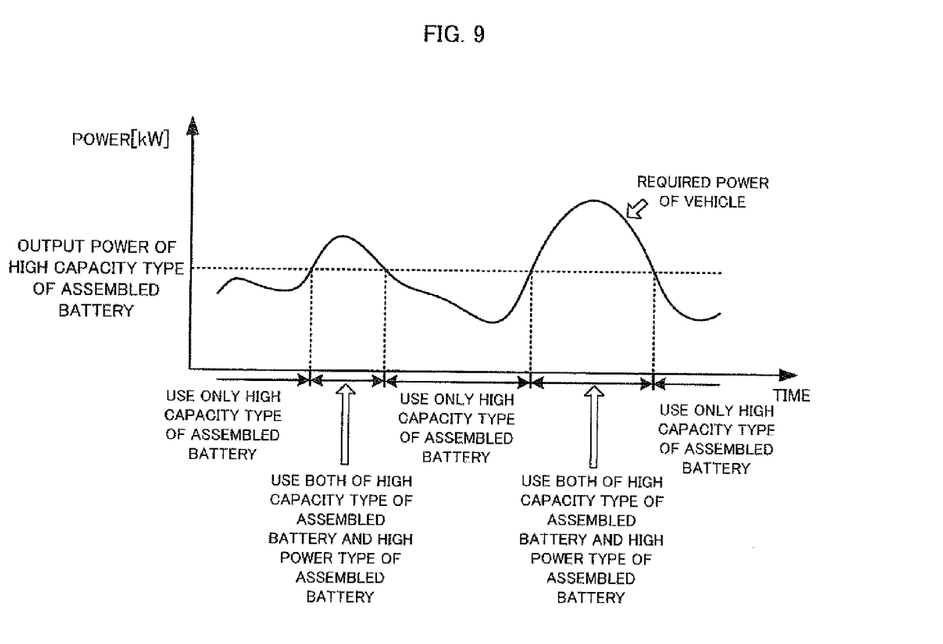
FIG. 9 is a graph for describing the use status of the high capacity type of assembled battery and the high power type of assembled battery.

FIG. 9 shows a graph for describing the use status of the assembled batteries 10 and 20 depending on the required power of the vehicle. In FIG. 9, the vertical axis represents power and the horizontal axis represents time. A waveform shown in FIG. 9 represents (an example of) the required power of the vehicle. The required power of the vehicle varies with the driving pattern of the vehicle.

When the required power of the vehicle does not reach the output power of the high capacity type of assembled battery 10, only the output of the high capacity type of assembled battery 10 can be used to drive the vehicle. On the other hand, when the required power of the vehicle is higher than the output power of the high capacity type of assembled battery 10, the outputs of the assembled batteries 10 and 20 can be used to drive the vehicle.

For example, the average value of the power of the load can be used as the power of the high capacity type of assembled battery 10. The load mentioned herein refers to the inverter 40 and the motor generator 50. Since the power of the load changes with time, the average value of the power of the load within a predetermined time period can be used as the average value. The predetermined time period can be set as appropriate, and can be set to several seconds, for example. The controller 100 can calculate the average value of the latest load power and set the calculated average value to the power supplied from the high capacity type of assembled battery 10 to the inverter 40.

The controller 100 can provide the power supplied from the high capacity type of assembled battery 10 to the inverter 40 at the average value of the load power by controlling the electric current value passing through the reactor 31 in the step-up converter 30. The electric current value serving as a control command value for the step-up converter 30 can be calculated by dividing the average value of the load power by the voltage of the inverter 40 (the voltage between the bus lines PB and NB).

The output power of the high capacity type of assembled battery 10 can be maintained at a fixed value (the average value of the load power), so that the high capacity type of assembled battery 10 can be discharged at an almost constant current. This can suppress occurrence of an overcurrent or an overvoltage in the high capacity type of assembled battery 10 to ensure the nominal voltage and the nominal current of the high capacity type of assembled battery 10.

As described above, since the internal resistance of the high capacity type of assembled battery 10 is higher than that of the high power type of assembled battery 20, the nominal voltage and the nominal current need to be ensured in the high capacity type of assembled battery 10 in order to suppress heat generation or the like. As described above, the high capacity type of assembled battery 10 has a higher temperature dependence than that of the high power type of assembled battery 20 and is deteriorated easily as the temperature is higher. Thus, the deterioration of the high capacity type of assembled battery 10 can be suppressed by avoiding the heat generation in the high capacity type of assembled battery 10.

While the step-up converter 30 is used to increase the output voltage of the high capacity type of assembled battery 10 in the present embodiment, the present invention is not limited thereto. The step-up converter 30 may be omitted. In this case, it is necessary to provide a power converter for maintaining the power supplied from the high capacity type of assembled battery 10 to the inverter 40 at a fixed value.

The invention claimed is:

1. A battery system comprising:
a motor serving as a driving source configured to drive a vehicle;
a high capacity type of assembled battery and a high power type of assembled battery each capable of supplying a power to the motor; and
a controller controlling charge and discharge of each of the high capacity type of assembled battery and the high power type of assembled battery,
wherein the high capacity type of assembled battery has an energy capacity relatively larger than that of the high power type of assembled battery, and the high power type of assembled battery can achieve charge and discharge with a current relatively larger than that of the high capacity type of assembled battery, and
the controller causes the high capacity type of assembled battery to be discharged continuously, and controls charge and discharge of the high power type of assembled battery such that an SOC of the high power type of assembled battery is matched with a predetermined value while the high capacity type of assembled battery is discharged continuously, and
the controller causes the high power type of assembled battery to be discharged continuously such that the SOC of the high power type of assembled battery becomes lower than the predetermined value while the high capacity type of assembled battery is not discharged continuously.

2. The battery system according to claim 1, further comprising a power converter converting an output power of the high capacity type of assembled battery into a power to be supplied to the motor,
wherein the controller controls the power converter to maintain the power to be supplied from the high capacity type of assembled battery to the motor at a fixed power.

3. The battery system according to claim 2, wherein the power converter is a step-up converter increasing an output voltage of the high capacity type of assembled battery, and
the controller controls an electric current value passing through a reactor of the step-up converter to maintain the power to be output from the step-up converter to the motor at the fixed power.

4. The battery system according to claim 2, wherein the high power type of assembled battery is connected to a power line connecting the power converter with the motor.

5. The battery system according to claim 2, wherein the fixed power is an average value of a required power in a predetermined time period.

6. The battery system according to claim 1, wherein the controller causes the high power type of assembled battery to output a power of the required power exceeding the output power of the high capacity type of assembled battery.

7. The battery system according to claim 1, wherein each of the high capacity type of assembled battery and the high power type of assembled battery is charged with a power received from a power source provided externally to the vehicle while the high capacity type of assembled battery and the high power type of assembled battery are not discharged continuously.

8. A control method of controlling charge and discharge of each of a high capacity type of assembled battery and a high power type of assembled battery each capable of supplying a power to a motor serving as a driving source configured to drive a vehicle;
wherein the high capacity type of assembled battery has an energy capacity relatively larger than that of the high power type of assembled battery, and the high power type of assembled battery can achieve charge and discharge with a current relatively larger than that of the high capacity type of assembled battery, the method comprising:

continuously discharging the high capacity type of assembled battery;

controlling charge and discharge of the high power type of assembled battery such that an SOC of the high power type of assembled battery is matched with a predetermined value while the high capacity type of assembled battery is discharged continuously; and continuously discharging the high power type of assembled battery such that the SOC of the high power type of assembled battery becomes lower than the predetermined value while the high capacity type of assembled battery is not discharged continuously.

9. The control method according to claim 8, wherein the power to be supplied from the high capacity type of assembled battery to the motor is maintained at a fixed power.

10. The control method according to claim 9, wherein a step-up converter is used to increase an output voltage of the high capacity type of assembled battery and to output the increased voltage to the motor, and an electric current passing through the step-up converter is controlled to maintain the power to be output from the step-up converter to the motor at the fixed power.

11. The control method according to claim 9, wherein the fixed power is an average value of a required power in a predetermined time period.

12. The control method according to claim 8, wherein the high power type of assembled battery outputs a power of the required power exceeding an output power of the high capacity type of assembled battery.

13. The control method according to claim 8, wherein each of the high capacity type of assembled battery and the high power type of assembled battery is charged with a power supplied from a power source provided externally to the vehicle while the high capacity type of assembled battery and the high power type of assembled battery are not discharged continuously.

14. The control method according to claim 10, wherein the fixed power is an average value of a required power in a predetermined time period.

* * * * *